US011138344B2

(12) United States Patent
Saha et al.

(10) Patent No.: US 11,138,344 B2
(45) Date of Patent: Oct. 5, 2021

(54) SECURING ACCESS TO USER DATA STORED IN A CLOUD COMPUTING ENVIRONMENT

(71) Applicant: Ooma, Inc., Sunnyvale, CA (US)

(72) Inventors: Shamindra Saha, Castro Valley, CA (US); Paxshal Mehta, Milpitas, CA (US); Sunita Rajain, Cupertino, CA (US)

(73) Assignee: Ooma, Inc., Sunnyvale, CA (US)

( * ) Notice: Subject to any disclaimer, the term of this patent is extended or adjusted under 35 U.S.C. 154(b) by 195 days.

(21) Appl. No.: 16/503,013

(22) Filed: Jul. 3, 2019

(65) Prior Publication Data
US 2021/0004491 A1 Jan. 7, 2021

(51) Int. Cl.
| | |
|---|---|
| *G06F 21/64* | (2013.01) |
| *H04W 4/029* | (2018.01) |
| *H04W 12/10* | (2021.01) |
| *H04W 12/02* | (2009.01) |
| *H04L 29/06* | (2006.01) |
| *H04W 12/03* | (2021.01) |
| *G06F 16/10* | (2019.01) |

(52) U.S. Cl.
CPC ............ *G06F 21/64* (2013.01); *H04L 63/107* (2013.01); *H04W 4/029* (2018.02); *H04W 12/02* (2013.01); *H04W 12/03* (2021.01); *H04W 12/10* (2013.01); *G06F 16/10* (2019.01)

(58) Field of Classification Search
CPC .... G06F 21/64; G06F 16/10; G06F 17/30321; G06F 17/30958; G06F 17/3053; G06F 17/30887; H04W 12/03; H04W 4/029; H04W 12/10; H04W 12/02; H04W 12/069; H04W 12/106; H04W 12/61; H04L 63/107; H04L 67/1097; H04L 63/123
See application file for complete search history.

(56) References Cited

U.S. PATENT DOCUMENTS

| | | |
|---|---|---|
| 6,831,556 B1 | 12/2004 | Boykin |
| 7,129,872 B1 | 10/2006 | Qvortrup et al. |
| 7,412,450 B1 * | 8/2008 | Bonwick ............... G06F 21/645 |

(Continued)

OTHER PUBLICATIONS

Houldings, David, "High Sensitivity Arduino Sound Level Detector," Internet of Things [Online], Feb. 17, 2014 [retrieved on Oct. 30, 2019] Retrieved from the internet: <http://davidhoulding.blogspot.com/2014/02/simple-high-sensitivity-arduino-sound.html>, 7 pages.

*Primary Examiner* — Abu S Sholeman
(74) *Attorney, Agent, or Firm* — Carr & Ferrell LLP (57) ABSTRACT

Systems and methods for securing access to user data stored in a networked location are described herein. A first user device may generate data that a user may desire to keep private. The generated data may be transmitted to, and stored at, a networked location, which then makes it vulnerable to malicious attack or exposure to unintended recipients. To protect the user data stored at the networked location, a recursive data file signature is generated for each stored data file. In order to access the stored data file, the user needs to provide the data file signature. In addition, every time the user data is accessed by the user, the data file signature is changed. In this way, the exposed data file signature will no longer be valid if an unauthorized entity tries to access the user data.

19 Claims, 8 Drawing Sheets

(56) References Cited

U.S. PATENT DOCUMENTS

| | | |
|---|---|---|
| 7,859,571 B1 | 12/2010 | Brown et al. |
| 8,175,584 B2 * | 5/2012 | Estevez ............... H04W 48/18 |
| | | 455/414.1 |
| 8,346,805 B2 * | 1/2013 | Kyler ................. H04L 63/123 |
| | | 707/781 |
| 8,918,877 B1 * | 12/2014 | Xie ....................... G06F 21/564 |
| | | 726/23 |
| 9,906,722 B1 | 2/2018 | Gigot |
| 10,115,029 B1 | 10/2018 | Day et al. |
| 10,372,995 B2 | 8/2019 | Zhang et al. |
| 10,872,231 B2 | 12/2020 | Vaidya et al. |
| 10,929,650 B2 | 2/2021 | Vaidya et al. |
| 2004/0247284 A1 | 12/2004 | Yamasaki |
| 2006/0221184 A1 | 10/2006 | Vallone et al. |
| 2007/0035632 A1 | 2/2007 | Silvernail et al. |
| 2007/0185989 A1 | 8/2007 | Corbett et al. |
| 2008/0224862 A1 | 9/2008 | Cirker |
| 2008/0278580 A1 | 11/2008 | Bentkovski |
| 2008/0297602 A1 | 12/2008 | Chang |
| 2008/0319604 A1 | 12/2008 | Follmer et al. |
| 2010/0287053 A1 | 11/2010 | Ganong et al. |
| 2011/0065424 A1 * | 3/2011 | Estevez ............... H04W 48/18 |
| | | 455/414.3 |
| 2013/0145178 A1 * | 6/2013 | Jeffries ............... G06F 21/6209 |
| | | 713/193 |
| 2013/0205031 A1 * | 8/2013 | Dorn .................... G06F 9/5072 |
| | | 709/227 |
| 2013/0215266 A1 | 8/2013 | Trundle et al. |
| 2013/0283035 A1 * | 10/2013 | Tomlinson ............ H04L 9/3247 |
| | | 713/150 |
| 2014/0328578 A1 | 11/2014 | Shafron et al. |
| 2015/0286875 A1 | 10/2015 | Land et al. |
| 2015/0317343 A1 * | 11/2015 | Cselle .................. H04L 63/145 |
| | | 707/741 |
| 2015/0358537 A1 | 12/2015 | Mirza |
| 2016/0050396 A1 | 2/2016 | Gali et al. |
| 2016/0105644 A1 | 4/2016 | Smith et al. |
| 2016/0253883 A1 | 9/2016 | Westmacott et al. |
| 2016/0277759 A1 | 9/2016 | Edpalm et al. |
| 2017/0154638 A1 | 6/2017 | Hwang et al. |
| 2017/0338966 A1 * | 11/2017 | Li ....................... H04L 63/0823 |
| 2017/0339343 A1 | 11/2017 | Zhang et al. |
| 2017/0358322 A1 | 12/2017 | Wiklof |
| 2017/0374284 A1 | 12/2017 | Shao |
| 2018/0206043 A1 | 7/2018 | Gabai |
| 2018/0268674 A1 | 9/2018 | Siminoff |
| 2019/0087506 A1 * | 3/2019 | Choh .................. G06F 16/9566 |
| 2019/0138795 A1 | 5/2019 | Vaidya |
| 2019/0141297 A1 | 5/2019 | Vaidya et al. |
| 2019/0141298 A1 | 5/2019 | Vaidya et al. |
| 2020/0388139 A1 | 12/2020 | Saha et al. |

* cited by examiner

FIG. 8

SECURING ACCESS TO USER DATA STORED IN A CLOUD COMPUTING ENVIRONMENT

CROSS-REFERENCE TO RELATED APPLICATION

N/A

TECHNICAL FIELD

The present disclosure relates to systems and methods to secure and prevent unauthorized access to private user data residing in a public computing environment with secured accessibility, from intentional or inadvertent public disclosure to unauthorized users.

BACKGROUND

As smart devices become more ubiquitous in society, increasing amounts of data from these smart devices is stored in cloud computing environments, including publicly accessible cloud systems with secured accessibility. While a user may take precautions to protect personal user devices, a user cannot control the security of the cloud system where the data is actually stored. Further, a user cannot control the security of the communication network that is utilized to transfer the data to and from the cloud system. Thus, mechanisms are needed to ensure secure storage and access to user data stored in a cloud computing environment, even if the cloud system or a public network router that accesses the cloud system is hacked.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are processor-implemented systems and methods for securing data in a data file storage system in a cloud computing environment, the method comprising: receiving a data file for storage in the cloud computing system via a communication network, the received data file generated by a first wireless-enabled device associated with a user; automatically generating a first data file signature for the received data file; transmitting the generated first data file signature to a second wireless-enabled device associated with the user; receiving a request from the second wireless-enabled device associated with the user to access the data file, the request comprising the generated first data file signature; authenticating the request from the second wireless-enabled device at least in part by verifying the generated first data file signature in the request; transmitting the data file to the second wireless-enabled device associated with the user; automatically generating a second data file signature for the data file, wherein the second data file signature for the data file is different from the first data file signature for the data file; and transmitting the generated second data file signature to the second wireless-enabled device associated with the user.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The disclosure relates to a system and methods for securing access to data stored in a public computing environment with secured accessibility, such as a cloud computing environment. In particular, securing access to a publicly exposed media data file location. The system allows a data file (such as a media file) to be stored in a publicly accessible remote location with secured accessibility, such as a public cloud computing environment. When a user device calls the media file to playback the media content, the file location (such as URL) of the media file from the cloud system becomes publicly exposed. The present invention describes a unique method to secure access to such a media file, despite any public disclosure of its URL or other location identifier for the public cloud where it is stored.

In various embodiments, the present disclosure is utilized with a consumer-friendly camera to be deployed in any one or more indoor physical space (such as a bedroom, living room, office, etc.) and/or one or more of any outdoor physical space (such as a patio, backyard, parking lot, etc.). The camera, through use of specially designed hardware and specially programmed software, can record video clips of any duration when a triggering activity is detected by one or more sensors on the camera, and/or by a microphone on the camera. The camera may transmit captured video, audio, and/or other data from its sensors, through a Network to a data file storage system, which contains software operating on a remote physical or virtual server (such as in a cloud server).

The data file storage system may further comprise a data file signature generator, which utilizes a plurality of parameters of the data file to automatically generate a data file signature. This signature is specific to the particular data file and is required to view the contents of the data file. The data file signature may be temporary, and set to expire every time the contents of the data file is viewed on a user device, transmitted to the user device, or at any other predetermined time interval. In various embodiments, signatures associated with different types of data files may be set to expire at different time intervals, or upon the meeting of predetermined criteria.

The data file storage system may further be in communication with a data analysis system that analyzes content in the data file. For example, the data analysis system may detect certain faces, activity, or sounds, that are concerning, from a media file. The detection of the certain items in the media content may trigger the corresponding data file signature to expire at a different predetermined time interval, or upon the meeting of different criteria conditions.

In some embodiments, pre-processing software operating on a user device (such as a camera), can mark specific video frames that contain a human face. That is, while recording the video on the camera itself, individual frames are processed simultaneously in camera firmware and a metadata file is generated and updated with information regarding the specific video frame(s) in which a human face was detected. The recorded video along with the metadata information is transmitted to other software for further analysis. The other software may operate via a processor separate from the camera itself, such as on a separate connected server in a cloud or elsewhere. Detection of a human face may influence the expiry parameters for the data file signature determined by the data file signature generator.

In other embodiments, the camera can identify specific video frames that contain a known object other than a human. For example, a camera can identify video frames containing another body part of a human, a body part of an animal, and/or an inanimate object. In further embodiments, pre-processing software operating on the camera itself can mark specific video frames that contain a particular known object that is deemed potentially threatening. For example, while recording the video on the camera itself, individual frames may be processed simultaneously in camera firmware and a metadata file generated and updated with information regarding the specific video frame(s) in which a potentially threatening person (such as a known threatening person), object (such as a weapon), or sound (such as a gunshot) was detected. Detection of one or more of these items may influence an expiry parameter for the data file signature determined by the data file signature generator.

Figure 1:
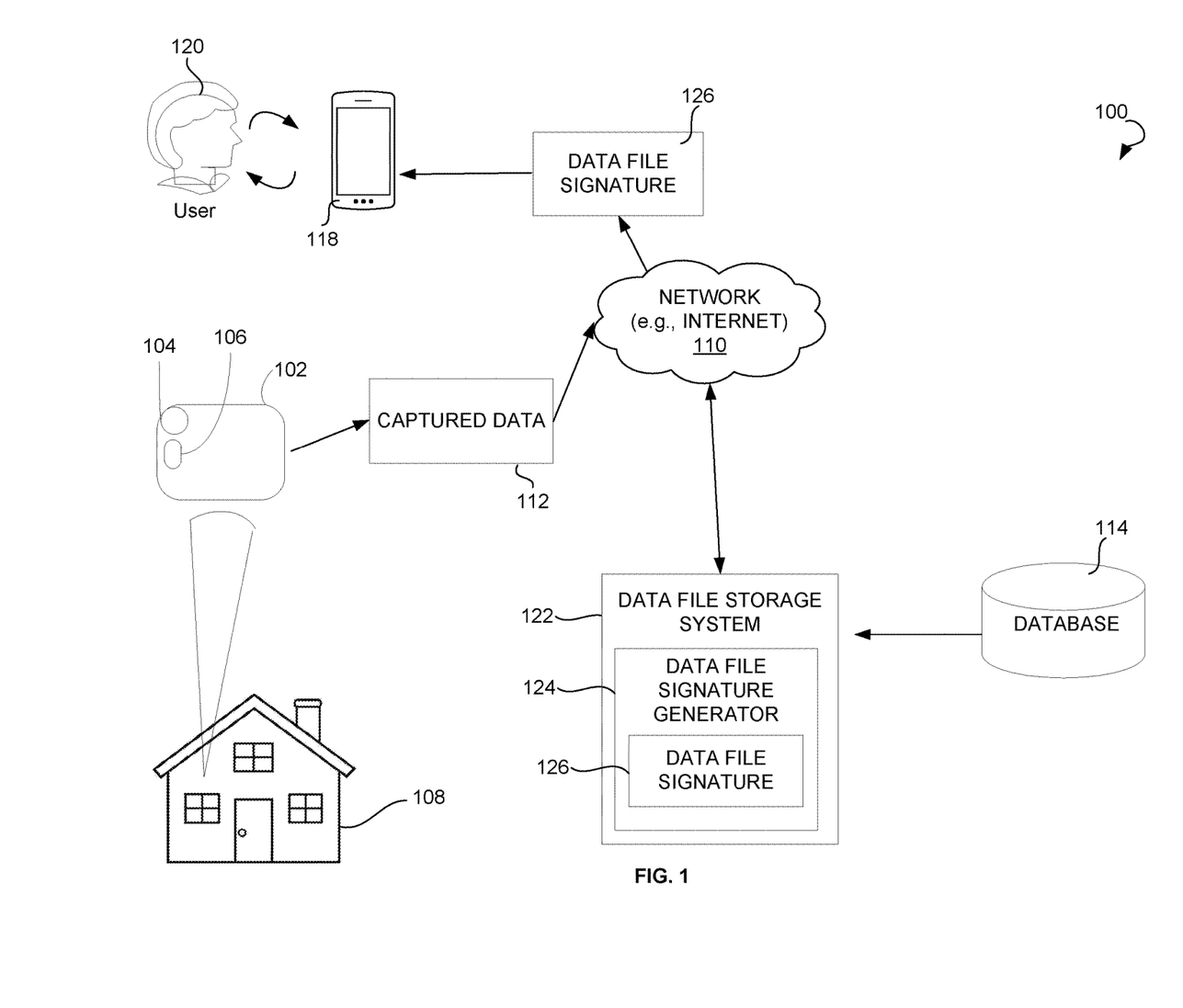
FIG. 1 illustrates an environment within which systems and methods securing a publicly exposed media data file location can be implemented, according to example embodiments.

FIG. 1 illustrates an environment 100 within which systems and methods for securing a publicly exposed data file location can be implemented, in accordance with some embodiments. The environment 100 may include a camera 102 containing a camera lens 104, and camera sensor(s) 106. The camera 102 may be deployed in a physical space 108, such as a house. Though not explicitly shown in exemplary FIG. 1, camera 102 also has one or more additional components in various embodiments that enable its operation for the purposes of the present disclosure.

While a camera 102 is depicted in the exemplary embodiment of FIG. 1 for simplicity, it will be understood by persons of ordinary skill in the art that any wired or wireless communication-enabled device associated with a user can be used instead of, or in addition to, a camera. That is, a user communication-enabled device in physical space 108 could be any one or more of: a smart appliance, smartwatch, other smart home device (such as thermometer, speaker, or doorbell), intelligent assistant device (such as Amazon Echo, Google Home), fitness tracker, smartphone, tablet, etc.

In the exemplary environment of FIG. 1, a camera 102 is depicted. The camera 102 can record audio, video (with or without audio), and/or or sensor data. This captured data 112 from the camera 102 may be transmitted via a network 110 to a data file storage system 122 (also referred to as "system 122"), which may include a data file signature generator 124 that generates a data file signature 126 for each data file. The data file storage system 122 may further utilize data structures (such as database 114) and one or more computing processors and volatile and/or non-volatile memory.

After receiving captured data 112, the data file storage system 122 may store the file in its repository (such as in database 114). Substantially simultaneously, the data file signature generator 124 generates a data file signature 126 for the stored file.

In various embodiments, the data file signature 126 is composed of any number of characters that are based on any number of parameters associated with the data file. For example, the data file signature 126 may be composed of 64-128 alphanumeric and/or special characters, generated based on 2-8 parameters associated with the data file. Exemplary parameters can include any one or more of parameters such as: data file length, URL or other file storage location, file name, timestamp of data file creation, time of data file signature generation, camera 102 identifier, camera 102 location, identifying information for user 120, identifier for any objects, activities, sounds, or humans detected in pre-processed captured media, etc. As would be understood by persons of ordinary skill in the art, any combination of parameters associated with the captured data 112 can be utilized to generate the associated data file signature 126.

The data file signature 126 is then transmitted through network 110 to an application operating on a user device 118 or a web browser operating on user device 118, to allow user 120 to call the captured data 112 on user device 118 via the data file signature 126, without the need for a separate login process. Each of these components is discussed in further detail herein.

A camera 102 may be deployed in any physical space 108 to record audio, video, and/or other environmental characteristics around the physical space 108. While physical space 108 is depicted in exemplary FIG. 1 as a house, a person of ordinary skill in the art will understand that camera 102 may be deployed in any indoor physical space, such as a room or hallway in a residence, a room or hallway in a non-residential building, or any other space. The camera 102 may also be located in any outdoor physical space, such as a patio, backyard, front yard, parking lot, parking garage, etc. Further, while only one camera 102 is depicted in FIG. 1 for simplicity, there can be any number of cameras in physical space 108. If multiple cameras are located in physical space 108, one or more of the cameras may be in wireless communication with one another, in exemplary embodiments.

Further, while camera 102 is depicted in FIG. 1 as a standalone device, in other embodiments, camera 102 may be incorporated as a part of other electronic devices. For example, camera 102 may be incorporated as part of a smartphone, tablet, intelligent personal assistant, or other smart electronic device.

Figure 2:
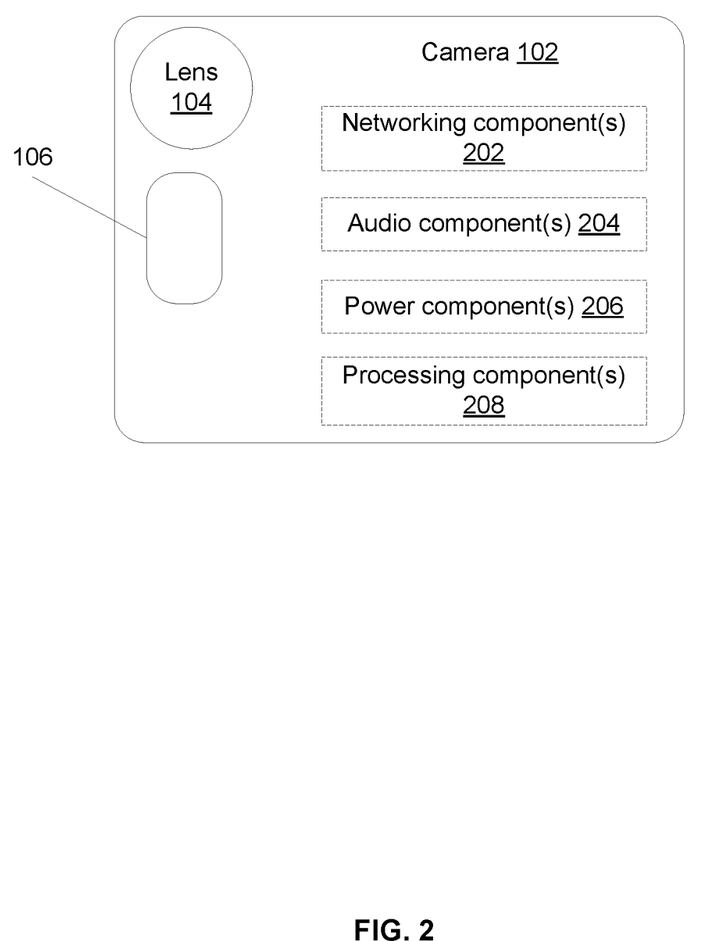
FIG. 2 illustrates an exemplary camera that can be used with embodiments of the present disclosure.

Camera 102 is described in further detail with respect to FIG. 2. In various embodiments, camera 102 is a consumer-friendly camera that can be utilized by a human user without needing to have any specialized camera expertise. The camera 102 may have one or more lens 104, with which video is captured. In exemplary embodiments, lens 104 may be any type of lens typically found in consumer cameras, such as a standard prime lens, zoom lens, and wide angle lens.

Camera 102 further has one or more sensors 106. Sensor(s) 106 may be any type of sensor to monitor conditions around the camera 102. By way of non-limiting example, sensor 106 may comprise one or more of a PIR (passive infrared) sensor that can bring to life colored night vision, a motion sensor, a temperature sensor, a humidity sensor, a luminosity sensor to measure light levels, a GPS, etc. As would be understood by persons of ordinary skill in the art, other types of sensors can be utilized to monitor other types of conditions as well around camera 102.

Also, as discussed herein, camera 102 may be a different networked device associated with user 120 in other embodiments. For example, instead of camera 102, environment 100 may have a different device purchased by user 120 that is capable of wired or wireless communications.

In some embodiments, camera 102 may be continuously recording and transmitting captured data 112 to data file storage system 122. In other embodiments, camera 102 may record a predetermined amount of time (e.g., 10 seconds) and analyze the captured video and/or sensor data either through processing on the camera 102 itself, or by remote video analysis software. The short recorded video clip may be analyzed to see if there is a need to continue recording or not. For example, camera 102 may continue recording if any activity is detected, if a certain sensor threshold has been crossed, if a certain threat level is predicted, or any other configurable threshold. In other embodiments, camera 102 may utilize activity-based recording, where camera 102 is triggered on with the occurrence of a triggering event, and then continues to record for a predetermined amount of time.

Referring to FIG. 2, camera 102 has additional components that enable its operation. For example, camera 102 may have power component(s) 206. Power component(s) 206 may comprise an electrical connector interface for electronically coupling a power source to, or for providing power to the camera 102. Electrical connector interface may comprise, for example, an electrical cable (the electrical cable can be any of a charging cable, a FireWire cable, a USB cable, a micro-USB cable, a lightning cable, a retractable cable, a waterproof cable, a cable that is coated/covered with a material that would prevent an animal from chewing through to the electrical wiring, and combinations thereof), electrical ports (such as a USB port, micro-USB port, microSD port, etc.), a connector for batteries (including rechargeable battery, non-rechargeable battery, battery packs, external chargers, portable power banks, etc.), and any other standard power source used to provide electricity/power to small electronic devices.

In an exemplary embodiment, power component(s) 206 comprises at least one battery provided within a housing unit. The battery may also have a wireless connection capability for wireless charging, or induction charging capabilities.

Camera 102 also comprises audio component(s) 204. In various embodiments, audio component(s) 204 may comprise one or more one-way or two-way microphones for receiving, recording, and transmitting audio.

Camera 102 further has processing component(s) 208 to enable it to perform processing functions discussed herein. Processing component(s) 208 may comprise at least one processor, static or main memory, and software such as firmware that is stored on the memory and executed by a processor. Processing component(s) 208 may further comprise a timer that operates in conjunction with the functions disclosed herein.

In various embodiments, a specialized video processor is utilized with a hardware accelerator and specially programmed firmware to identify triggering events, begin recording audio and/or video (in either Standard Definition or High Definition), cease recording of audio and/or video, process the captured video frames and insert metadata information regarding the specific video frame(s) containing an identified object, activity, person, or sound of interest. Camera 102 then transmits the recorded audio, video, and metadata to a data file storage system 122 operating via software in a cloud computing environment. As used herein, captured media may comprise any of recorded audio, video, or sensor data by camera 102.

Camera 102 also comprises networking component(s) 202, to enable camera 102 to connect to network 110 in a wired or wireless manner, similar to networking capabilities utilized by persons of ordinary skill in the art. Further, networking component(s) 202 may also allow for remote control of camera 102 by user 120 and/or an administrator or manufacturer of camera 102.

In various embodiments, the networking communication capability of camera 102 can be achieved via an antenna attached to any portion of camera 102, and/or via a network card. Camera 102 may communicate with network 110 via wired or wireless communication capabilities, such as radio frequency, Bluetooth, ZigBee, Wi-Fi, electromagnetic wave, RFID (radio frequency identification), etc.

A human user 120 may further interact with, and control certain operations of the camera 102 via a graphical user interface displayed on a user device 118. The graphical user interface can be accessed by a human user 120 via a web browser on the user device 118 (such as a desktop or laptop computer, netbook, smartphone, tablet, etc.). A human user may further interact with, and control certain operations of the camera 102 via a dedicated software application on a smartphone, tablet, smartwatch, laptop or desktop computer, or any other computing device with a processor that is capable of wireless communication. In other embodiments, a human user 120 can interact with, and control certain operations of the camera 102 via a software application utilized by the user 120 for controlling and monitoring other aspects of a residential or non-residential building, such as a security system, home monitoring system for Internet-enabled appliances, voice assistant such as Amazon Echo, Google Home, etc.

Returning to FIG. 1, camera 102 captures video as discussed herein. The captured data 112 is then transmitted to data file storage system 122 via network 110.

The network 110 may include the Internet or any other network capable of communicating data between devices. Suitable networks may include or interface with any one or more of, for instance, a local intranet, a Personal Area Network, a Local Area Network, a Wide Area Network, a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection.

Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network can further include or interface with any one or more of an RS-232 serial connection, an IEEE-1394 (FireWire) connection, a Fiber Channel connection, an IrDA (infrared) port, a SCSI (Small Computer Systems Interface) connection, a Universal Serial Bus (USB) connection or other wired or wireless, digital or analog interface or connection, mesh or Digi® networking.

The network 110 may be a network of data processing nodes that are interconnected for the purpose of data communication. The network 110 may include any suitable number and type of devices (e.g., routers and switches) for forwarding commands, content, requests, and/or responses between each user device 118, each camera 102, and the data file storage system 122.

The data file storage system 122 may include a server-based distributed software application, thus the system 122 may include a central component residing on a server and one or more client applications residing on one or more user devices and communicating with the central component via the network 110. The user 120 may communicate with the system 122 via a client application available through the user device 118.

The user device 118, in some example embodiments, may include a Graphical User Interface for displaying a user interface associated with the system 122. The user device 118 may comprise a mobile telephone, a desktop personal computer (PC), a laptop computer, a smartphone, a tablet, a smartwatch, intelligent personal assistant device, smart appliance, and so forth.

Data file storage system 122 may comprise software application(s) for processing captured data 112, as well as other capabilities. Data file storage system 122 is further in communication with one or more data structures, such as database 114. In exemplary embodiments, at least some components of data file storage system 122 operate on one or more cloud computing devices or servers.

In various embodiments, data file storage system 122 may further be in communication with a video analysis system, a system for facial recognition, a threat determination system, or any other system for analyzing and/or processing captured data 112.

When captured data 112 is stored within data file storage system 122, data file signature generator 124 generates a unique data file signature 126 associated with the data file. In an example embodiment, data file signature 126 may comprise 4-6 sets of variable parameters that are associated with the data file. Any protocol that wants to access or read the data file will need to do so via the data file signature 126. The data file cannot be accessed by any computing device without knowledge of the data file signature 126. In this way, the associated data file can be securely stored in a public cloud computing system (such as Amazon Web Services, Google Drive, Dropbox, etc.) with moderated access to the data file. For example if the data file is a recorded video, the recorded video can only be accessed and played from data file storage system 122 by submission of the associated data file signature 126. Once transmitted to user device 118, the recorded video in data file 116 can be displayed via a user interface on a screen of user device 118.

In some embodiments, one data file signature 126 can be generated for all content captured by camera 102 within a certain predetermined time frame (i.e., minutes, hours, or days). In other embodiments, one data file signature 126 can be generated for each type of content captured by camera 102 within a certain predetermined time frame. In other embodiments, one data file signature 126 can be generated each time camera 102 ends a recording session, thus resulting in multiple media files and associated signatures each day.

Figure 3:
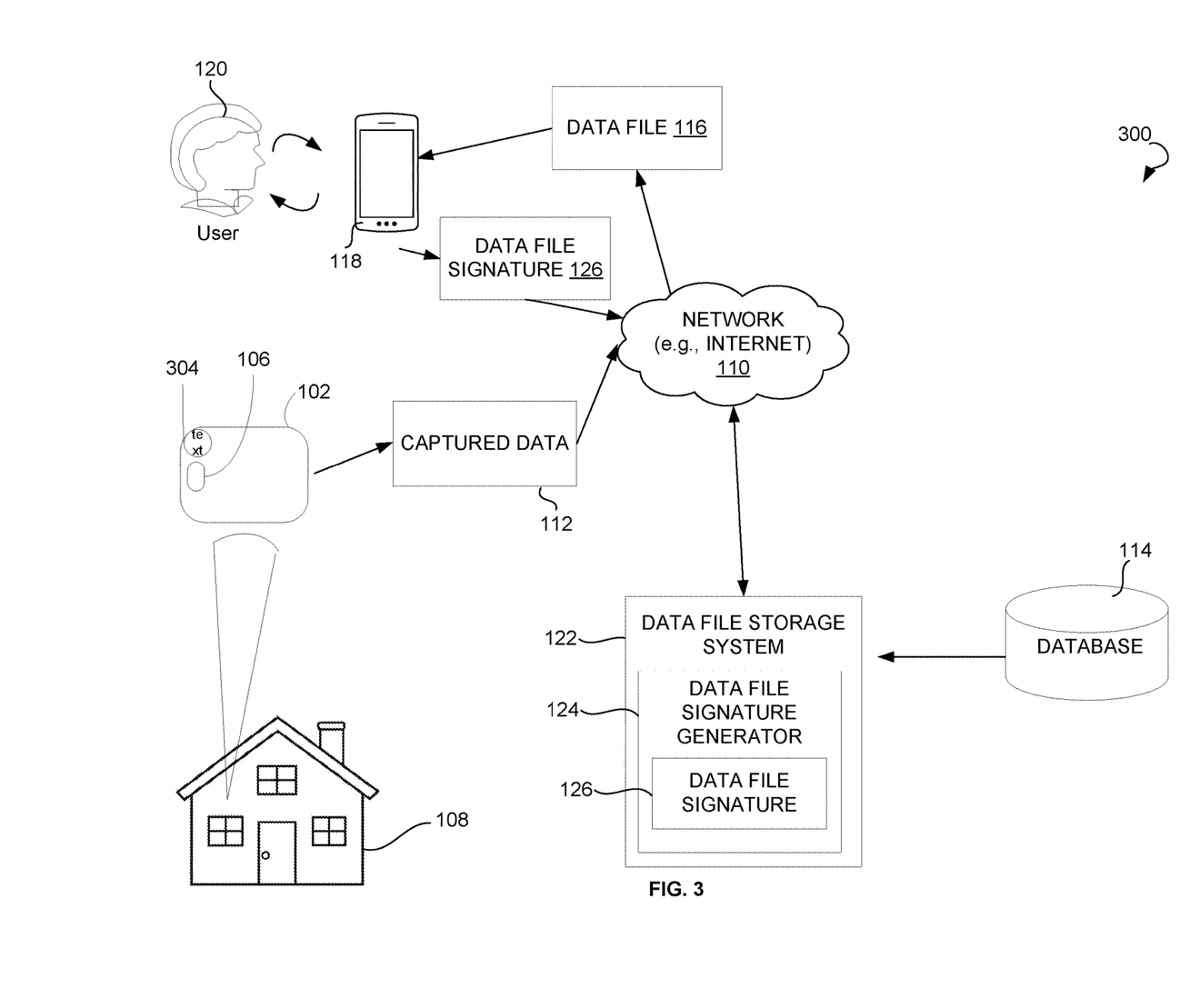
FIG. 3 illustrates an environment for accessing content in a data file via a data file signature, according to example embodiments.

FIG. 3 depicts an exemplary environment 300 for accessing a data file via a data file signature. In the exemplary environment 300, captured data 112 is stored within data file storage system 122 as one or more data files. Data file signature generator 124 generates a data file signature 126 for the associated data file, based on parameters associated with the data file. This data file signature 126 is securely transmitted through network 110 to a software application operating on user device 118, accessible by user 120. In this exemplary embodiment, user 120 is a known and authorized operator or owner of camera 102.

User 120 may desire to access the data file 116 at any point in time. In the exemplary environment 300, user 120 may wish to playback audio and/or video that was recorded by camera 102. User 120 initiates user device 118 to request the recorded information in data file 116 by calling the file using the data file signature 126. Upon verification of data file signature 126 by data file storage system 122, the associated data file 116 is transmitted through network 110 to user device 118 and can be viewed by user 120.

When the data (such as audiovisual media) in data file 116 is being played on user device 118, the data file 116 becomes exposed through its transmission from data file storage system 122 through network 110 to user device 118. As such, as soon as data file 116 begins to buffer for playback on user device 118, the file name and/or signature associated with data file 116 is changed by data file storage system 122. One or more parameters of data file 116 change, which in turn causes the data file signature 126 to change. In this manner, even if a networked component (such as a router or server) within network 110, or the cloud computing system housing data file storage system 122 is hacked, any unauthorized user will not be able to access data file 116 since the data file signature has changed since the time of the hack. That is, any person other than user 120 will not be able to playback a media file from camera 102 using a file location (such as URL) because the data file signature necessary to access the file is immediately invalidated and regenerated each and every time the media file is played on a user's computing device.

A new file name and data file signature is generated by data file signature generator 124 every time data file 116 is accessed. When a media data file is played on user device 118, the data file signature 126 is tagged to user device 118 using an HTTP secure mode. Thus, user 120 receives data file signature 126 via a secure process, and utilizes the signature to play a media data file at any later time. That is, the data file 116 is requested by user device 118 using the data file signature 126, to access data file 116 (and play any media content contained therein) on user device 118.

Once generated, the data file signature 126 is transmitted to user device 118 via a secure mode. In exemplary embodiments, a system of signatures is automatically generated by the Cloud Software that is associated with each artifact related to the video/media, and these signatures are generated without the knowledge of the end user 120. The data file signature 126 transmission to the user device 118 is via any secure mode, such as HTTPS. No other parties are privy to the generated data file signature 126, not even an administrator of the data file storage system 122, or the cloud computing system within which system 122 is located.

Further, data file signature 126 generated has parameters that are specific to the owner/operator of camera 102 (or other networked device present in physical space 108). That is, at least some parameters of data file 116 will vary from one user 120 to another, even though multiple users are using the same manufactured product version of camera 102.

By saving captured data 112 from camera 102 in a manner that is specific to user 120 associated with camera 102, and only allowing user 120 access to the data file signature required to play back media content contained within data file 116, all captured data 112 from camera 102 can be securely stored in a public cloud.

Further, a data file signature 126 can be recursively created out of parameters associated with data file 116. That is, data file signature generator 124 may create one data file signature 126 that is valid for a predetermined amount of time. In exemplary embodiments, data file signature 126 can be valid for any number of minutes, hours, days, weeks, months, or any other predetermined amount of time. When data file 116 is played on user device 118, as discussed above, the data file signature 126 is automatically changed by data file signature generator 124 to a second data file signature. In addition, data file signature 126 may be automatically changed to a second data file signature upon the expiration of a predetermined period of time, regardless of whether the data file 116 was ever called by user device 118.

Data file signature 126 can be changed to a second data file signature by any means, including adding an additional parameter to the previous signature, removing a parameter from the previous signature, changing the order of parameters from the first signature, etc. By recursively changing the signature needed to access data file 116, the data file can remain secure and free from unauthorized access, despite being publicly exposed by being stored in a public cloud environment, and/or accessed over a public network. Thus, even if the cloud storage system housing data file storage system 122, or any component of network 110 is hacked, no third party can access data file 116 or playback any media contained therein.

Other existing systems utilize differing methods to secure content that is stored in a public cloud. In some existing systems, a person needs to authenticate themselves to a specific server in order to access content. This authentication can occur via login credentials, or even tokens. This can pose a burden on service providers who need to maintain a database of login credentials for all of their users, to assist users in accessing content if they forget some or all of their login credentials. Further, tokens are allocated to specific users only, and don't provide moderated access to specific data files.

Embodiments of the present disclosure allow a user 120 to access content using a data file signature 126, such that login credentials or tokens are not necessary to authenticate a user 120 before content contained within data files can be accessed. The data file itself can only be accessed via validation of a signature that is continually changing, and only an authorized user 120 and their associated user device 118 will have access to the ever evolving data file signature.

Other existing systems utilize encryption technology to protect content stored in a networked location, such as a public cloud. However, when a user device 118 accesses an encrypted media file, the user device 118 will need to decrypt the file first, before it can begin playing the file. This increases the computation resources required by user device 118, and also introduces a delay in playback of the media file. That is, user devices typically do not have the computing power to instantaneously playback an encrypted media file as it is being accessed over a network. Thus, there is overhead to an encryption/decryption process for securing and accessing the secured content stored in a networked location.

Further, a secure layer of communication (such as an encrypted channel) is utilized by some existing systems to secure content. However, this requires the use of more network bandwidth, which may not always be available from a personal user device 118, particularly if the user device 118 is a smartphone, smartwatch, or the like.

With the presently disclosed invention, content stored in a networked location is secured from unauthorized access, regardless of public exposure of the content via streaming over an unsecured network, or malicious hacking. Because the signature required to access the content changes immediately after user device 118 begins to access the content, or upon the expiration of a predetermined time period, no other computing device will be able to call the content since the publicly exposed signature is no longer valid to call the content a second time from the networked stored location of the content. Thus, a unique dynamic signature mechanism is disclosed for accessing content stored in a cloud computing system.

Further, utilizing the presently disclosed invention, no additional bandwidth is required to securely access content stored in the networked location, and no delay is introduced in the call time of media playback. That is, media can begin playing immediately on user device 118, when received by user device 118 over network 110. Once user device 118 calls data file 116 with data file signature 126, media in data file 116 begins loading immediately for playback on user device 118.

Figure 4:
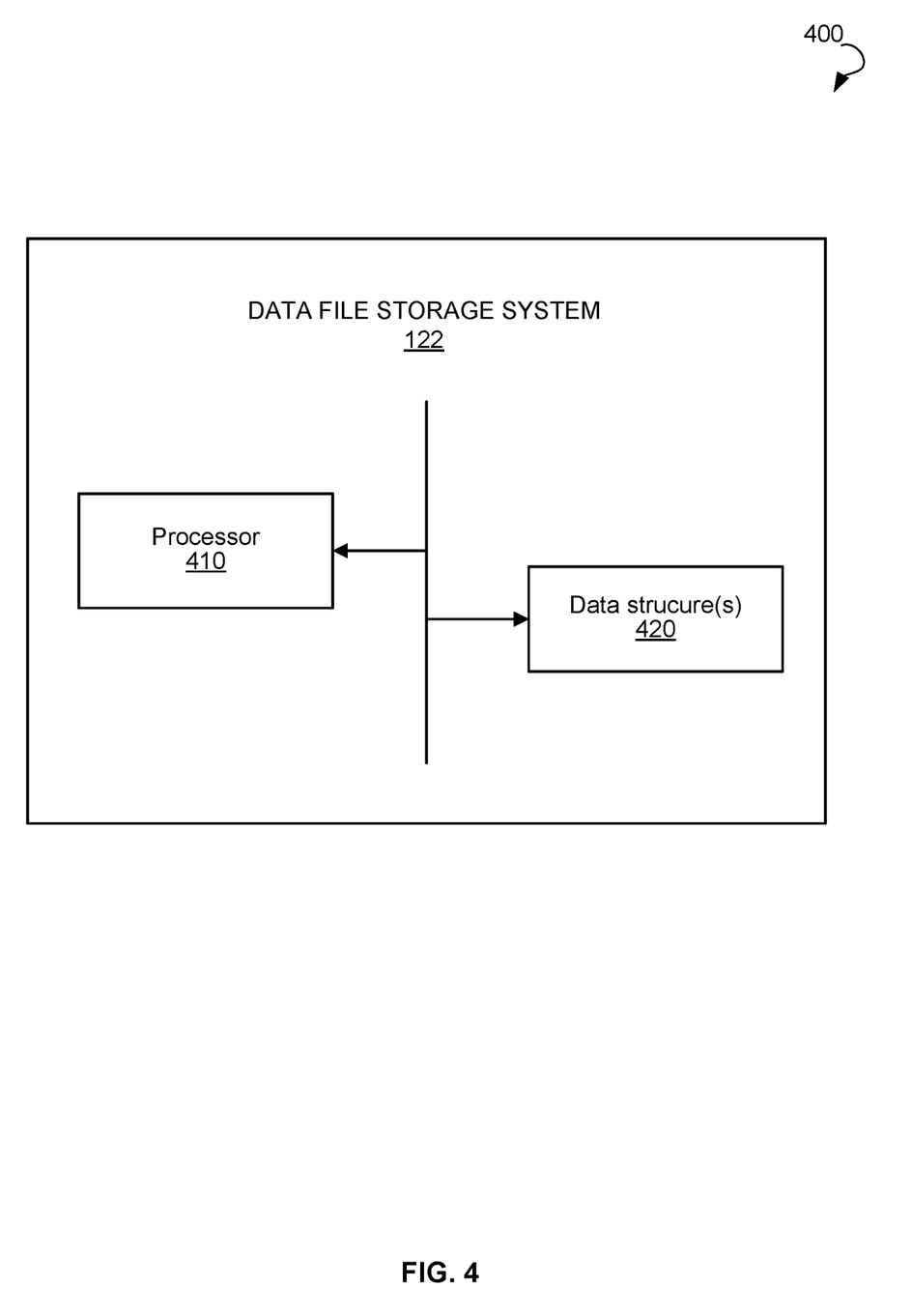
FIG. 4 is a block diagram showing various components of a data file storage system, in accordance with certain embodiments.

FIG. 4 is a block diagram 400 showing various modules of a data file storage system 122 for practicing exemplary embodiments of the present disclosure. The system 122 may include a processor 410 and data structure(s) 420. Data structure(s) 420 may include one or more decision trees, databases, or any other data structure. Data structure(s) 420 may utilize a database that is the same or different from database 114 of exemplary FIGS. 1 and 3.

Data structure(s) 420 may include computer-readable instructions for execution by the processor 410. The processor 410 may include a programmable processor, such as a microcontroller, central processing unit (CPU), and so forth. In other embodiments, the processor 410 may include an application-specific integrated circuit or programmable logic array, such as a field programmable gate array, designed to implement the functions performed by the system 122. In various embodiments, the system 122 may be installed on a user device or may be provided as a cloud service residing in a cloud computing environment. The operations performed by the processor 410 and the data structure(s) 420 are described in further detail herein.

Figure 5:
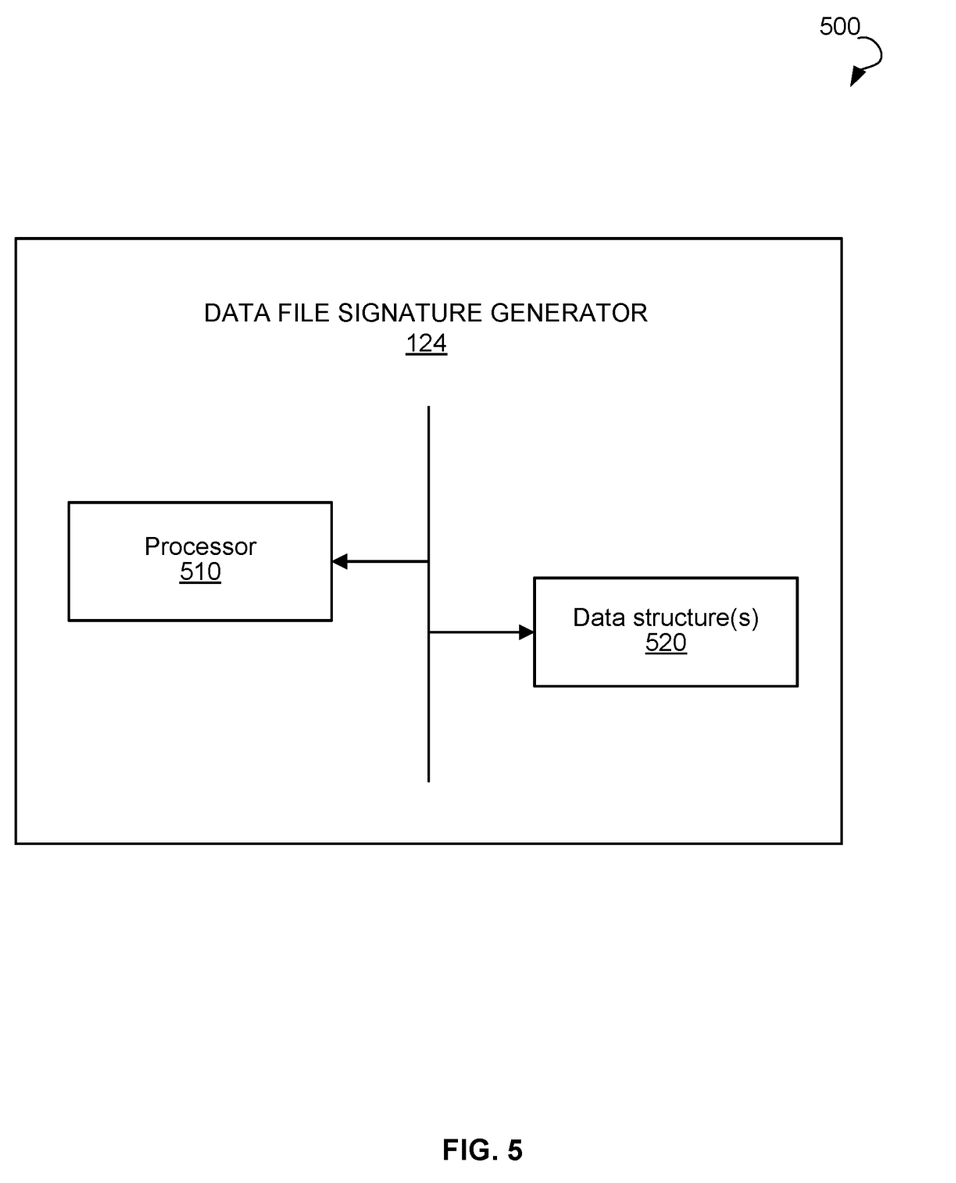
FIG. 5 is a block diagram showing various components of a data file signature generator system, in accordance with certain embodiments.

FIG. 5 is a block diagram 500 showing various modules of a data file signature generator 124, for automatically generating and re-generating data file signatures for data files stored in system 122, in accordance with certain embodiments. The data file signature generator 124 may include a processor 510 and data structure(s) 520. The processor 510 of the data file signature generator 124 may be the same, or different from processor 410 of the data file storage system 122.

Data structure(s) 520 may include one or more decision trees, databases, or any other data structure. Data structure(s) 520 may utilize a database that is the same or different from data structure(s) 520 of data file storage system 122, and/or database 114 of exemplary FIGS. 1 and 3.

Data structure(s) 520 may include computer-readable instructions for execution by the processor 510. The processor 510 may include a programmable processor, such as a microcontroller, central processing unit (CPU), and so forth. In other embodiments, the processor 510 may include an application-specific integrated circuit or programmable logic array, such as a field programmable gate array, designed to implement the functions performed by the data file signature generator 124. In various embodiments, the data file signature generator 124 may be installed on a user device or may be provided as a cloud service residing in a cloud storage. The operations performed by the processor 510 and data structure(s) 520 are described in further detail herein.

Figure 6:
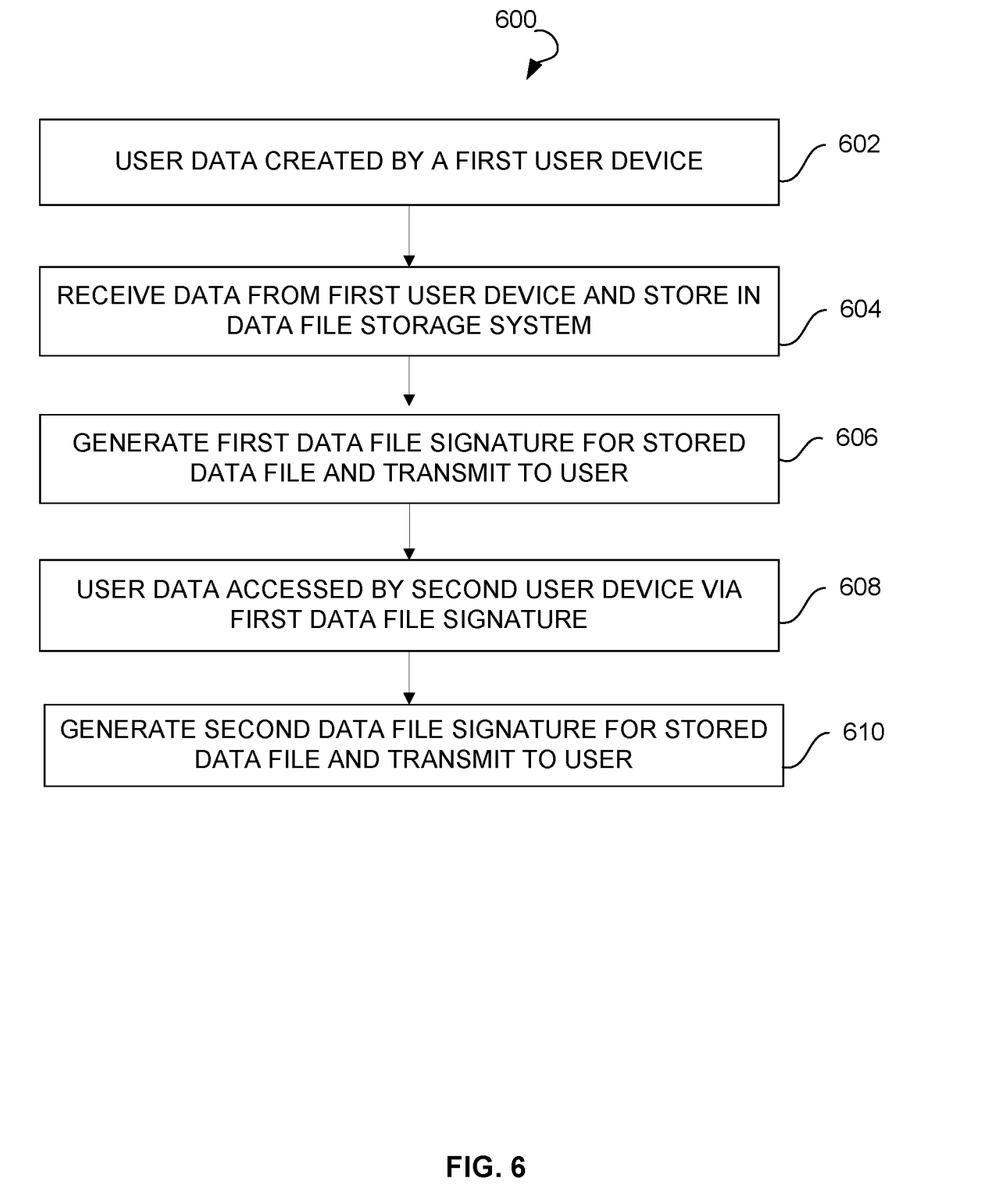
FIG. 6 is a process flow diagram showing a method for securing a media data file stored in a public cloud computing system, according to an example embodiment.

FIG. 6 is a process flow diagram showing a method 600 for securing access to content in a data file stored in a public cloud computing system. The method 600 is described with reference to the exemplary environment of FIG. 1 for simplicity. In some embodiments, the operations may be combined, performed in parallel, or performed in a different order. The method 600 may also include additional or fewer operations than those illustrated. The method 600 may be performed by processing logic that may comprise hardware (e.g., decision making logic, dedicated logic, programmable logic, and microcode), hardware accelerator, software (such as firmware or other software run on a special-purpose computer system or general purpose computer system), or any combination of the above.

Various operations of method 600 may be performed by camera 102, data file storage system 122, user device 118, or any combination thereof.

The method 600 may commence at operation 602 with user data created by a first user device. In the exemplary embodiment of FIG. 1, the first user device is camera 102. As discussed herein, data created by camera 102 may comprise audio, video, and/or sensor data of the surrounding environment where camera 102 is located. Further, camera 102 may pre-process some or all of the created media with internal hardware and/or software systems. Recorded video may be a video clip of any duration. In preferred embodiments, a recorded video clip is between 5-30 seconds, preferably about 20 seconds in length.

In operation 604, the data created by the first user device (e.g., camera 102) is received by data file storage system 122 via any wireless or wired communication means. The received file(s) are stored within the data file storage system 122. As discussed herein, data file storage system 122 may be a central or distributed computing system. Further, data file storage system 122 may be located in a cloud computing network.

At operation 606, data file storage system 122 generates a first data file signature for a first stored data file, such as a media file (e.g., video recording). In various embodiments, a separate data file signature may be generated for each stored data file, for each stored data file of a specific type, for each file type, or for files from a single camera 102 recording session. The generated first data file signature is then transmitted to a user device 118 associated with a user 120 of camera 102 via a secure mechanism. In exemplary embodiments, the first data file signature is transmitted to a user device that is used to operate or control aspects of the first user device (e.g., camera 102). In some instances, the user device that is used to operate or control aspects of the first user device is referred to herein as a second user device.

At operation 608, a second user device (such as user device 118) accesses a data file generated by the first user device, from data file storage system 122. The second user device will need to call the data file using the first data file signature, in order to access the contents of the data file. If the first data file signature transmitted by user device 118 to data file storage system 122 is correct, the contents of the data file are immediately viewable on user device 118. In the case of data file containing recorded video, the recorded video begins to immediately play on user device 118 without any additional delay (other than transmit time through network 110).

Substantially simultaneously to data file content access (e.g., media playback) on user device 118, data file storage system 122 generates a second data file signature for the same data file, at operation 610. This generated second data file signature is then transmitted to user device 118 associated with a user 120 of camera 102 via a secure mechanism. In this way, the user will need to utilize the generated second data file signature in order to playback the same (media) data file again on user device 118. Thus, the link to the media content within data file storage system 122 that is exposed to any public router in network 110 is secured.

As would be understood by persons of ordinary skill in the art, operations 608 and 610 are iterative and can continue any number of times, as long as the stored data file exists in data file storage system 122. That is, every time user device 118 accesses the data file, a new data file signature is generated and transmitted to the user.

Figure 7:
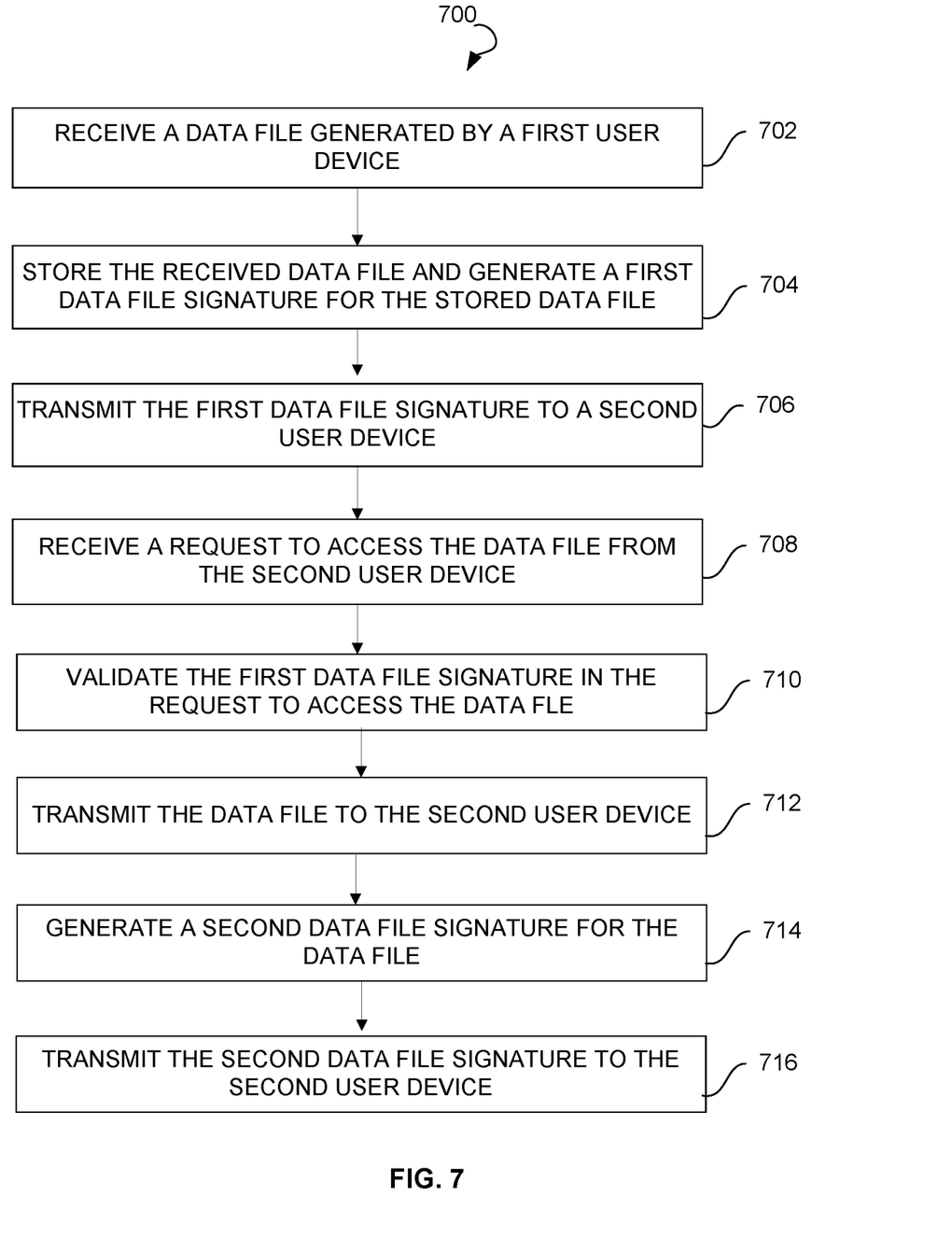
FIG. 7 is a process flow diagram showing a method executed by a data file storage system, in accordance with certain embodiments.

FIG. 7 is a process flow diagram showing a method 700 that may be executed by the data file storage system 122 (via a processor executing instructions stored in memory) for securing access to content in a stored data file. As discussed herein, the data file may be stored in a location that is potentially vulnerable to malicious attack, such as in a public cloud computing system. The method 700 is described with reference to the exemplary environment of FIG. 1 for simplicity. In some embodiments, the operations may be combined, performed in parallel, or performed in a different order. The method 700 may also include additional or fewer operations than those illustrated. The method 700 may be performed by processing logic that may comprise hardware (e.g., decision making logic, dedicated logic, programmable logic, and microcode), hardware accelerator, software (such as firmware or other software run on a special-purpose computer system or general purpose computer system), or any combination of the above.

The method 700 may commence at operation 702 with system 122 receiving a data file generated by a first user device, also sometimes referred to herein as a first wireless-enabled device, or a first communication-enabled device.

The received data may be received by data file storage system 122 via any wireless or wired communication mechanism.

In the exemplary embodiment of FIG. 1, the first user device is a camera 102 system that records audio, video, and/or sensor data for the surrounding environment where it is located. The received data file may be a video recording of any length of time or file size.

In operation 704, the data file storage system 122 stores the received data file and generates a first data file signature for the stored data file, as discussed herein. The first data file signature is based on one or more parameters of stored data file.

At operation 706, the generated first data file signature is transmitted to a second user device via a secure mechanism. The second user device is also sometimes referred to herein as a second wireless-enabled device, or a second communication-enabled device. In the exemplary environment of FIG. 1, the second user device is user device 118 associated with user 120 of camera 102.

At operation 708, system 122 receives a request from the second user device (e.g., user device 118) to access the data file created by the first user device (e.g., camera 102). The request includes the first data file signature.

At operation 710, system 122 validates the first data file signature in the request to access the data file. If the signature is correct, the content from the data file is immediately accessible to the second user device at operation 712. If the content from the data file is a video recording, the video will begin to immediately play on a screen of the second user device without any additional delay (other than transmit time through network 110).

Substantially simultaneously to content access via the second user device (e.g., user device 118), data file storage system 122 generates a second data file signature for the same data file, at operation 714. The second data file signature is created based on one or more parameters associated with the data file, and is a different value than the first data file signature. This generated second data file signature is then transmitted to the second user device at operation 716 via a secure mechanism. In exemplary embodiments, the data file signature may be transmitted to proprietary software operating on the second user device, such as a dedicated application operating on the second user device. In this way, the user will need to utilize the generated second data file signature in order to access the contents of the same data file again on user device 118. Thus, the link to the stored data file within data file storage system 122 that is exposed to any public router in network 110 is secured, and unauthorized access to data created by the first user device is prevented.

As would be understood by persons of ordinary skill in the art, operations 708-716 are iterative and can continue any number of times. That is, every time user device 118 accesses the data file, a new data file signature is generated and transmitted to the user.

Figure 8:
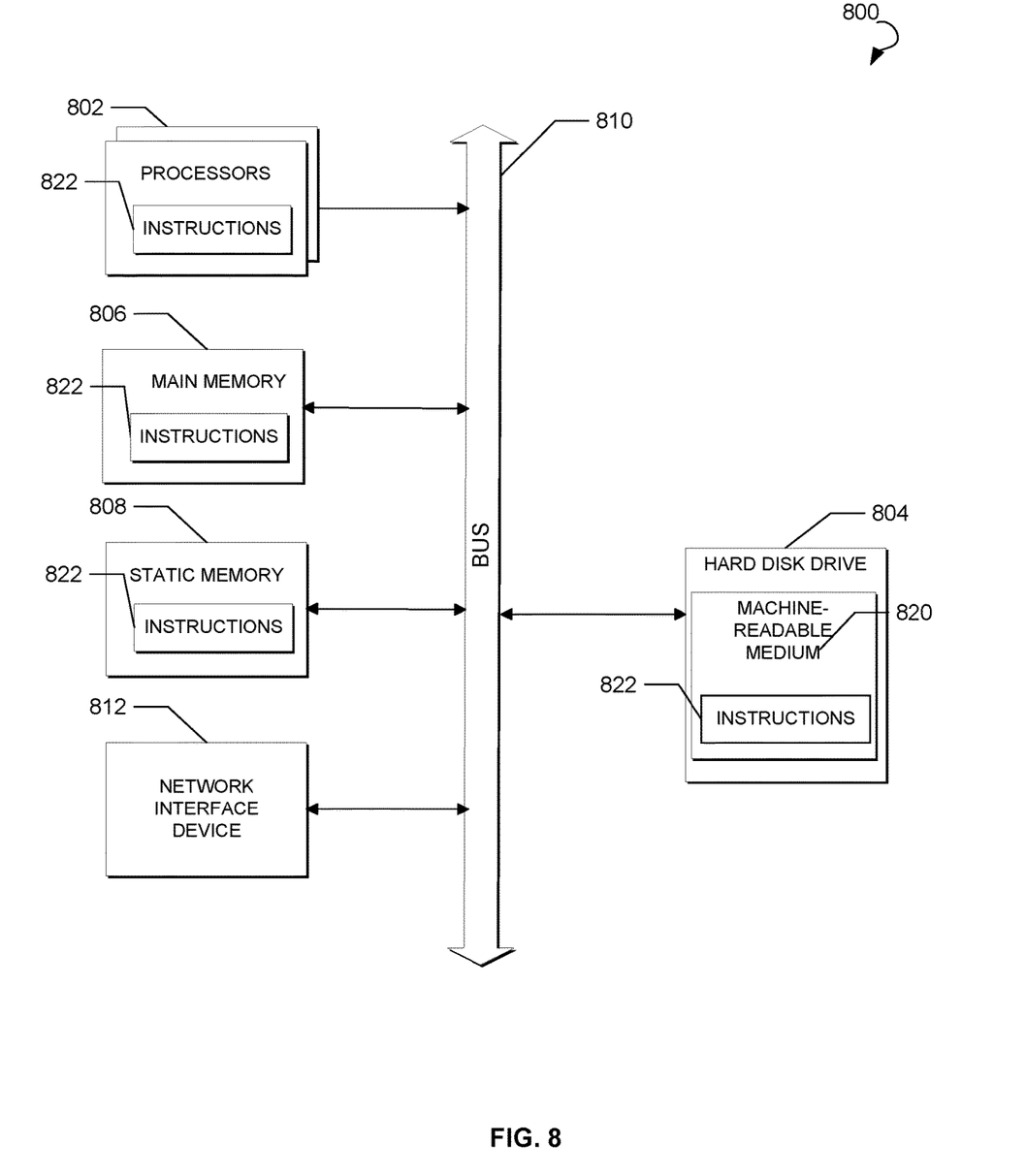
FIG. 8 shows a diagrammatic representation of a computing device for a machine in the exemplary electronic form of a computer system, within which a set of instructions for causing the machine to perform any one or more of the methodologies discussed herein can be executed.

FIG. 8 shows a diagrammatic representation of a computing device for a machine in the exemplary electronic form of a computer system 800, within which a set of instructions for causing the machine to perform any one or more of the methodologies discussed herein can be executed. Computer system 800 may be implemented within camera 102, data file storage system 122, and/or data file signature generator 124.

In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a PC, a tablet PC, a set-top box, a cellular telephone, a digital camera, a portable music player (e.g., a portable hard drive audio device, such as an Moving Picture Experts Group Audio Layer 3 player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor or multiple processors 802, a hard disk drive 804, a main memory 806, and a static memory 808, which communicate with each other via a bus 810. The computer system 800 may also include a network interface device 812. The hard disk drive 804 may include a machine-readable medium 820, which stores one or more sets of instructions 822 embodying or utilized by any one or more of the methodologies or functions described herein. The instructions 822 can also reside, completely or at least partially, within the main memory 806 and/or within the processors 802 during execution thereof by the computer system 800. The main memory 806 and the processors 802 also constitute machine-readable media.

While the machine-readable medium 820 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, Random Access Memory (RAM), Read-Only Memory (ROM), and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems.

In some embodiments, the computer system 800 may be implemented as a cloud-based computing environment, such as a virtual machine operating within a computing cloud. In other embodiments, the computer system 800 may itself include a cloud-based computing environment, where the functionalities of the computer system 800 are executed in a distributed fashion. Thus, the computer system 800, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners, or such systems may be accessible to outside users who deploy applications within the computing infrastructure to obtain the benefit of large computational or storage resources.

The cloud may be formed, for example, by a network of web servers that comprise a plurality of computing devices, such as a client device, with each server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire, and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk, any other optical medium, any other physical medium with patterns of marks or holes, a RAM, a Programmable Read-Only Memory, an Erasable Programmable Read-Only Memory (EPROM), an Electrically Erasable Programmable Read-Only Memory, a FlashEPROM, any other memory chip or data exchange adapter, a carrier wave, or any other medium from which a computer can read.

Thus, computer-implemented methods and systems for securing access to user data (such as media content) stored in a public cloud computing system are described herein. Although embodiments have been described herein with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A data file storage system for securing data stored in a cloud computing environment, the data file storage system configured to communicate via at least one communication network, and the system comprising:
   a first processor;
   a first memory; and
   at least one data structure stored on the first memory;
   the first processor configured to execute instructions stored on the first memory to:
      receive a data file for storage in a cloud computing system via a communication network, the received data file generated by a first wireless-enabled device associated with a user;
      generate a first data file signature for the received data file;
      transmit the generated first data file signature to a second wireless-enabled device associated with the user;
      receive a request from the second wireless-enabled device associated with the user to access the data file, the request comprising the generated first data file signature;
      validate the request from the second wireless-enabled device at least in part by verifying the generated first data file signature in the request;
      transmit the data file to the second wireless-enabled device associated with the user;
      generate a second data file signature for the data file, wherein the generated second data file signature for the data file is different from the generated first data file signature for the data file; and
      transmit the generated second data file signature to the second wireless-enabled device associated with the user,
   wherein the first processor is further configured to:
      receive a request from the second wireless-enabled device associated with the user to access the data file, the request comprising the generated first data file signature;
      authenticate the request from the second wireless-enabled device at least in part by verifying the generated second data file signature in the request;
      transmit the data file to the second wireless-enabled device associated with the user;
      generate a third data file signature for the data file, wherein the generated third data file signature for the data file is different from the generated first data file signature for the data file and the generated second data file signature for the data file; and
      transmit the generated third data file signature to the second wireless-enabled device associated with the user.

2. The system of claim 1, wherein the generated first data file signature and the generated second data file signature are transmitted to the second wireless-enabled device associated with the user, via a secure communication channel.

3. The system of claim 1, wherein the first wireless-enabled device associated with the user is at least one of a wireless-enabled: camera, microphone, sensor, smartphone, smartwatch, smart home device, or tablet.

4. The system of claim 1, wherein the second wireless-enabled device associated with the user is at least one of a wireless-enabled: desktop computer, laptop computer, tablet, smartphone, smartwatch, smart home device, camera, or microphone.

5. The system of claim 1, wherein the received data file for storage in the cloud computing system is a media file comprising audio and/or video.

6. The system of claim 1, wherein the generated first data file signature and the generated second data file signature are received by a proprietary software application operating on the second wireless-enabled device associated with the user.

7. The system of claim 1, wherein the generated second data file signature expires after a predetermined period of time has elapsed, and the first processor automatically generates a third data file signature for the data file and transmits the third data file signature to the second wireless-enabled device associated with the user.

8. The system of claim 1, wherein the generated first data file signature comprises alphanumeric characters.

9. The system of claim 1, wherein the generated first data file signature comprises 4-64 characters.

10. The system of claim 1, wherein the generated first data file signature comprises alphanumeric characters representative of a plurality of parameters associated with the data file.

11. The system of claim 1, wherein the generated first data file signature comprises alphanumeric characters representative of at least two of the following parameters associated with the data file: data file storage location, data file length, timestamp of data file creation, device identifier for the first wireless-enabled device associated with the user, device identifier for the second wireless-enabled device associated with the user, identifier for the user, geographic location of the first wireless-enabled device, geographic location of the second wireless-enabled device, time of data file signature generation.

12. A method for securing data in a data file storage system in a cloud computing environment, the method comprising:
    receiving a data file for storage in a cloud computing system via a communication network, the received data file generated by a first wireless-enabled device associated with a user;
    automatically generating a first data file signature for the received data file;
    transmitting the generated first data file signature to a second wireless-enabled device associated with the user;
    receiving a request from the second wireless-enabled device associated with the user to access the data file, the request comprising the generated first data file signature;
    authenticating the request from the second wireless-enabled device at least in part by verifying the generated first data file signature in the request;
    transmitting the data file to the second wireless-enabled device associated with the user;
    automatically generating a second data file signature for the data file, wherein the generated second data file signature for the data file is different from the generated first data file signature for the data file; and
    transmitting the generated second data file signature to the second wireless-enabled device associated with the user.

13. The method of claim 12, wherein the first wireless-enabled device associated with the user is at least one of a wireless-enabled: camera, microphone, sensor, smartphone, smartwatch, smart home device, or tablet.

14. The method of claim 12, wherein the second wireless-enabled device associated with the user is at least one of a wireless-enabled: desktop computer, laptop computer, tablet, smartphone, smartwatch, smart home device, camera, or microphone.

15. The method of claim 12, wherein the generated first data file signature and the second data file signature are received by a proprietary software application operating on the second wireless-enabled device associated with the user.

16. The method of claim 12, wherein the generated second data file signature expires after a predetermined period of time has elapsed, and the method further comprises: generating a third data file signature for the data file; and
    transmitting the generated third data file signature to the second wireless-enabled device associated with the user.

17. The method of claim 12, wherein the generated first data file signature comprises 4-64 characters.

18. The method of claim 12, wherein the generated first data file signature comprises alphanumeric characters representative of a plurality of parameters associated with the data file.

19. The method of claim 12, wherein the generated first data file signature comprises alphanumeric characters representative of at least two of the following parameters associated with the data file: data file storage location, data file length, timestamp of data file creation, device identifier for the first wireless-enabled device associated with the user, device identifier for the second wireless-enabled device associated with the user, identifier for the user, geographic location of the first wireless-enabled device, geographic location of the second wireless-enabled device, time of data file signature generation.

* * * * *

UNITED STATES PATENT AND TRADEMARK OFFICE
CERTIFICATE OF CORRECTION

PATENT NO. : 11,138,344 B2
APPLICATION NO. : 16/503013
DATED : October 5, 2021
INVENTOR(S) : Shamindra Saha, Paxshal Mehta and Sunita Rajain Page 1 of 1

It is certified that error appears in the above-identified patent and that said Letters Patent is hereby corrected as shown below:

In the Claims

Column 18 Line 17 that portion reading:
"the second data file signature"
Should read:
"the generated second data file signature"

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*